June 4, 1957  C. S. MORRISON ET AL  2,794,307
CORN HARVESTER ATTACHMENT FOR COMBINE Filed Sept. 9, 1954  4 Sheets-Sheet 1

INVENTORS
C. S. MORRISON
H. H. DENISON
F. D. JONES

June 4, 1957  C. S. MORRISON ET AL  2,794,307
CORN HARVESTER ATTACHMENT FOR COMBINE
Filed Sept. 9, 1954  4 Sheets-Sheet 2

INVENTORS
C. S. MORRISON
H. H. DENISON
F. D. JONES

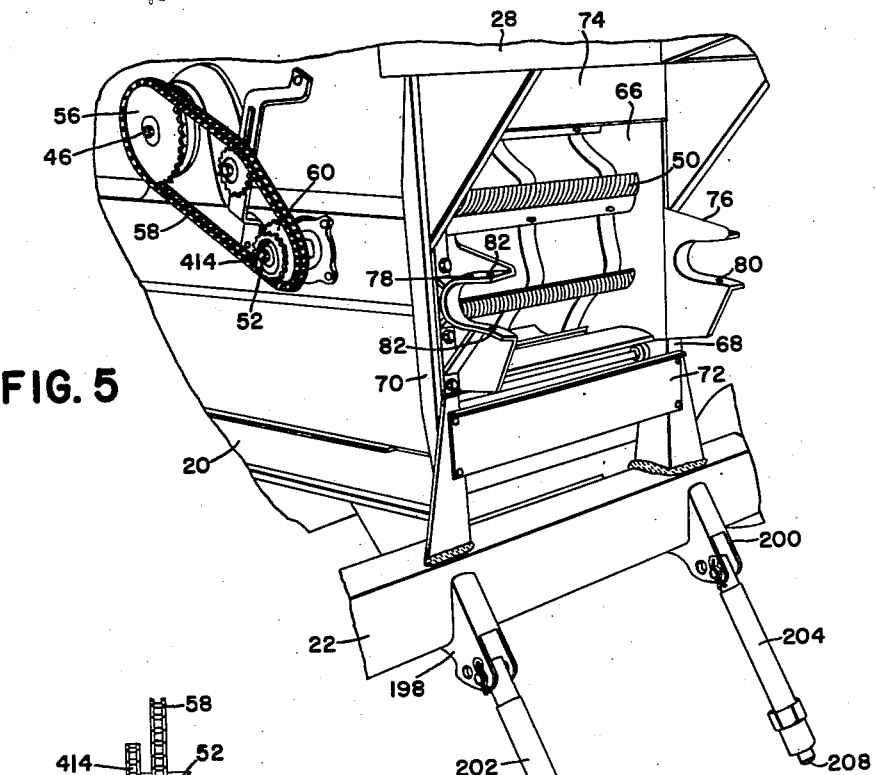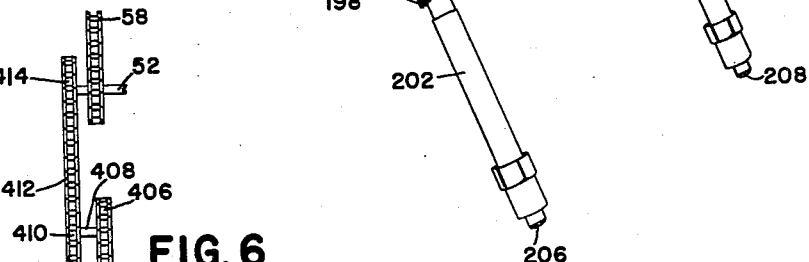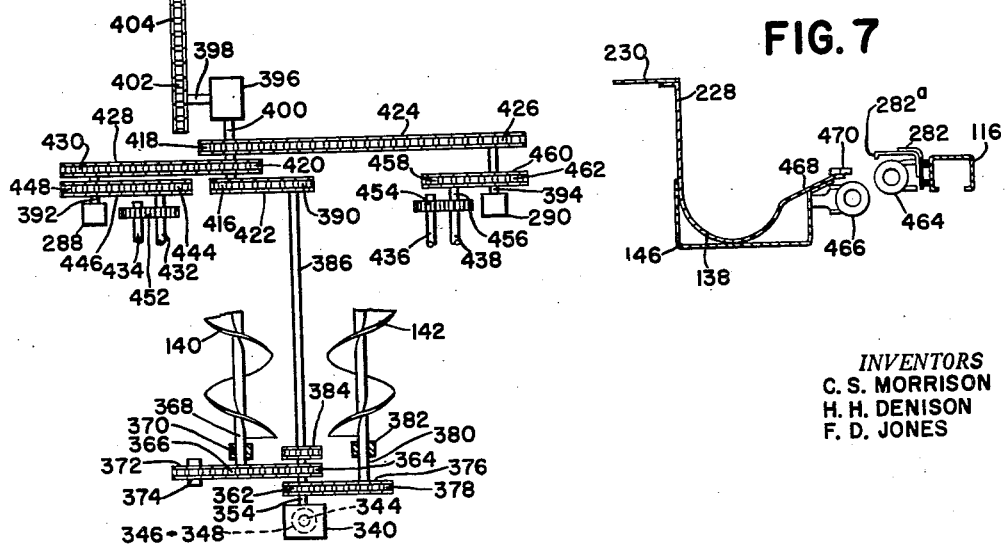

INVENTORS
C. S. MORRISON
H. H. DENISON
F. D. JONES 2,794,307

CORN HARVESTER ATTACHMENT FOR COMBINE

Charles S. Morrison and Henry H. Denison, Moline, Ill., and Frank D. Jones, Des Moines, Iowa, assignors to Deere & Company, Moline, Ill., a corporation of Illinois Application September 9, 1954, Serial No. 454,888

24 Claims. (Cl. 56—18)

This invention relates to a crop harvester and more particularly to a corn-harvesting attachment for replacement of the header on a conventional combine.

Corn is conventionally harvested for either ensilage or for seed, feed, and other commercial consumption. In the harvesting of corn for ensilage, stalks and ears alike are gathered by a machine of the forage harvester type and the entire crop is chopped up or otherwise reduced and is ultimately delivered in bulk to a silo or other suitable storage receptacle. However, in the harvesting of corn for seed, feed, and other commercial purposes, it has been conventional practice to utilize either a corn picker or a corn snapper. The basic distinction between the picker and the snapper is that the picker usually includes means for snapping the ears from the standing stalks as well as means for husking the ears and the husked ears are stored for a sufficient length of time to permit drying thereof before ultimate shelling, whereas the snapper does not have husking means and and the unhusked ears are stored and ultimately shelled. Although some machines have been designed that sever the standing stalks prior to the ear-snapping operation, the largest majority of machines operate on the principle of snapping the ears from standing stalks, leaving the stalks to be subsequently reduced by a separate machine such as a stalk chopper.

Attempts have been made in the past to utilize a conventional combine for the harvesting of corn, in which cases the standing crop would be cut just like grain and would be fed through the threshing mechanism of the combine. However, the differences between grain and corn indicated that the conventional combine, without modification, could not be successfully used on a large scale, primarily because the header mechanism of the conventional combine is not adequate to handle most types and varieties of corn; although, in most instances the threshing mechanism has proved adequate to accomplish both husking and shelling.

According to the present invention, an attachment has been designed to replace the conventional combine header, and this attachment features the proven characteristics of the corn picker or corn snapper and yet utilizes the basic threshing mechanism of the combine. The invention has for a principal object the provision of an attachment that may be readily mounted on and dismounted from a conventional combine in substitution for the combine header. Specifically, the harvesting attachment has been developed for use with a combine of the self-propelled type, a representative example of which machine has an upright body provided with a front inlet opening to which the harvester header and feeder house delivers harvested grain. The attachment, as a replacement for the header and feeder house, utilizes snapping and gathering mechanism especially designed for corn, and further incorporates means for feeding the snapped corn directly to the front inlet opening and consequently directly to the combine threshing mechanism.

The improved harvester attachment features a novel frame construction in which conveying housing structure is used as a structural or supporting element, doubling as well as means for containing conveying mechanism for feeding the snapped corn to the threshing means. The attachment frame is further characterized by novel mounting structure for utilization with the combine, drive mechanism having a power-transmitting shaft coaxial with the pivotal mounting of the attachment on the combine, improved auger housing construction and snapping roll supporting structure, and various other novel elements and subcombinations that will become apparent as a preferred embodiment of the invention is disclosed in detail in the ensuing description and accompanying sheets of drawings, the several figures of which will be described immediately below.

Fig. 5 is a fragmentary front perspective view, on approximately the scale of Fig. 3, showing the basic combine structure.

Fig. 6 is a schematic view outlining the drive mechanism for the attachment.

Fig. 7 is a sectional view, as seen along the line 7—7 of Fig. 4.

Figure 11:
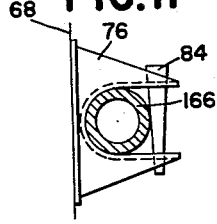
Fig. 11 is a fragmentary detail view showing one of the pivot mountings for connecting the harvester to the combine.
Figure 12:
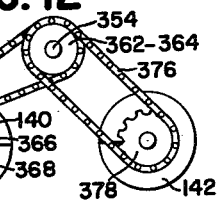
Fig. 12 is a schematic view of the auger drive.

The combine chosen for the purposes of illustration as the basic machine for which the corn harvester shown here has been specifically designed may be of the type shown in the U. S. patents to Oehler 2,529,180, Anderson 2,510,325, and Steffen 2,585,414; although, the attachment could be used with a different type of combine such as that shown in the U. S. patent to Dray 2,352,257, for example.

As shown here, the combine has an upright longitudinal body 20 carried at its front end on a transverse wheeled support in the form of an axle 22 and traction wheels 24 (only one of which is shown) and at its rear end by a steerable wheeled truck 26. Control of the combine, as is conventional, is accomplished from a forwardly mounted operator's station 28 on which are grouped various operating components, such as an operator's seat 30 and a steering wheel 32 for steering the wheeled truck 26.

The machine is propelled and its moving parts are operated from a power source, here in the form of an internal combustion engine 34 on the crankshaft of which is keyed a power output pulley 36. Power for the traction wheels 24 is obtained from the pulley 36 by means of an intermediate mechanism contained in a casing 38 and by the additional means of a pair of belts 40 and 42, the details of which are unimportant here, being shown in the above-mentioned Anderson patent.

A forwardly positioned larger pulley 44 is keyed to a transverse shaft 46 and is driven from the engine pulley 36 by means of a belt 48. The shaft 46 furnishes power for operating the threshing and separating components in the body 20. In the broken-away portion of Fig. 1, as well as in Fig. 5, there is shown a rotary threshing element or cylinder 50 mounted on a shaft 52 and conventionally cooperative with a concave 54.

The shaft 46 extends across the body 20 of the combine and has at its outer end a sprocket 56 that is connected by a drive chain 58 to a first sprocket 60 on the proximate end of the threshing cylinder shaft 52 (Fig. 5). This much of the drive is basic or peculiar to the particular type of machine illustrated. However, it is a feature of the present invention to utilize this drive for the corn-harvester attachment, the details of which will be set forth below.

When the combine is conventionally equipped with a header and reel, it is adapted to operate over a field of standing grain and to harvest and thresh the grain in what is called one operation, the threshed grain being ultimately delivered to a grain tank or bin 62 carried by the body 20 of the combine. This bin, when full, may be unloaded by an unloading auger 64, the details of a representative form of which appear in the previously mentioned patent to Steffen.

To the extent described, the combine constitutes a mobile frame of the self-propelled type. As best shown in Fig. 5, the forward portion of the upright body 20 provides a crop-inlet opening 66, disposed at a level above that of the transverse axle or wheeled support 22, and delineated at opposite sides by opposite side wall structure 68 and 70 and at its bottom and top by cross members 72 and 74 respectively. The inlet opening 66 is immediately below the operator's station 28, as will be seen. The opposite side wall portions 68 and 70 of the body 20 respectively carry support means, here pivot brackets 76 and 78 that are conventionally used for mounting the combine header, which, in the present case, has been removed to make room for the corn-harvester attachment. Each of the brackets is in the form of a forwardly opening pocket, the pocket in each case being provided by upper and lower apertured furcations, one of the apertures for the bracket 76 being visible at 80 and the vertically alined apertures in the bracket 78 being visible at 82. Each pair of vertically alined apertures receives a locking pin, as shown at 84 in Fig. 11, for locking in place trunnions mounted on the conventional header. The pivot brackets 76 and 78 are coaxial or alined and are transversely spaced apart on a transverse horizontal axis.

The corn-harvester attachment comprises generally a U-shaped frame element 86, longitudinal and centrally located conveying means or conveyor housing structure or element 88, right- and left-hand crop-harvesting devices 90 and 92 and appropriate shielding and styling structure including a central divider 94, a right-hand outer divider 96, a left-hand outer divider 98, a right- and left-hand side sheets 100 and 102, and a central hood 104, the side sheets 100 and 102 and the hood 104 being cross-connected by a transverse shield or hood 106. In the interests of clarity, this shielding and styling structure has been omitted from such Figs. as 4, 8, and 9.

The U-shaped frame 86 and the conveyor housing structure 88 form the backbone of the attachment. The frame 86 comprises a transverse beam 108 having opposite or right- and left-hand ends or outer portions 110 and 112. The beam is of elongated tubular construction and its length is such that when it is disposed in forwardly spaced relation to the front end of the combine body 20 the width of the attachment is greater than the width of the combine body, the arrangement being such that the row-crop devices 90 and 92 operate respectively on standing crops in a pair of adjacent rows and the tread or wheel spacing of the front wheels 24 being conventionally such that the wheels run respectively outwardly of and alongside the rows being harvested. The beam 108 constitutes the bight of the U-shaped frame and the sides of this frame are formed by right- and left-hand forwardly extending members in the form of arms 114 and 116. The rear ends of the arms 114 and 116 are rigidly secured, as by welding at 118 and 120, to the opposite ends 110 and 112 of the transverse beam 108, and the arms further have transversely alined front ends 122 and 124 respectively.

Rigidly secured to an intermediate or central portion of the beam 108 and projecting rearwardly therefrom is a U-shaped frame element 126 comprising a transverse right or frame member 128 and right- and left-hand side members or legs 130 and 132. The frame 126 may be additionally braced by a central leg 134. The frame 126 forms a basic part of the support for the conveyor housing structure 88.

Figure 1:
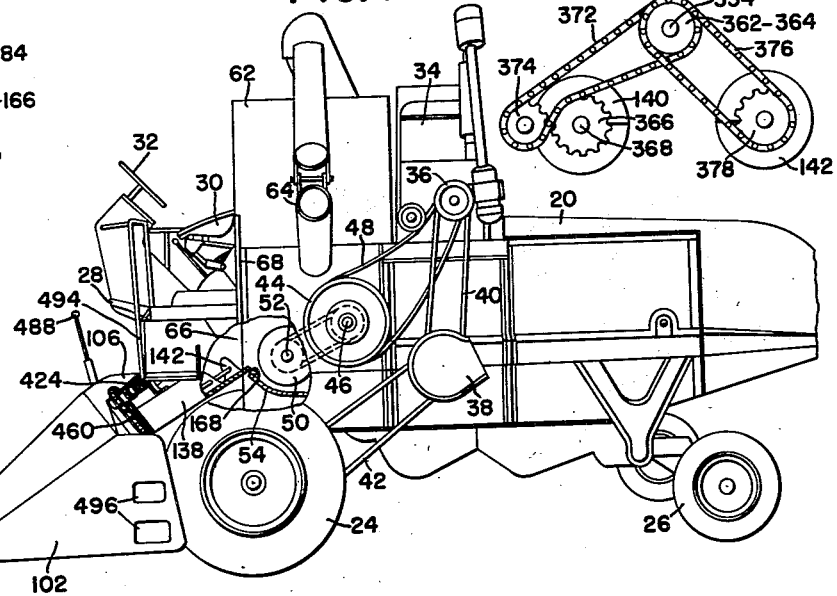
Fig. 1 is a side perspective view of the combine as equipped with the corn-harvesting attachment, a portion of the structure being broken away and parts being shown in section to expose inner parts thereof.
Figure 3:
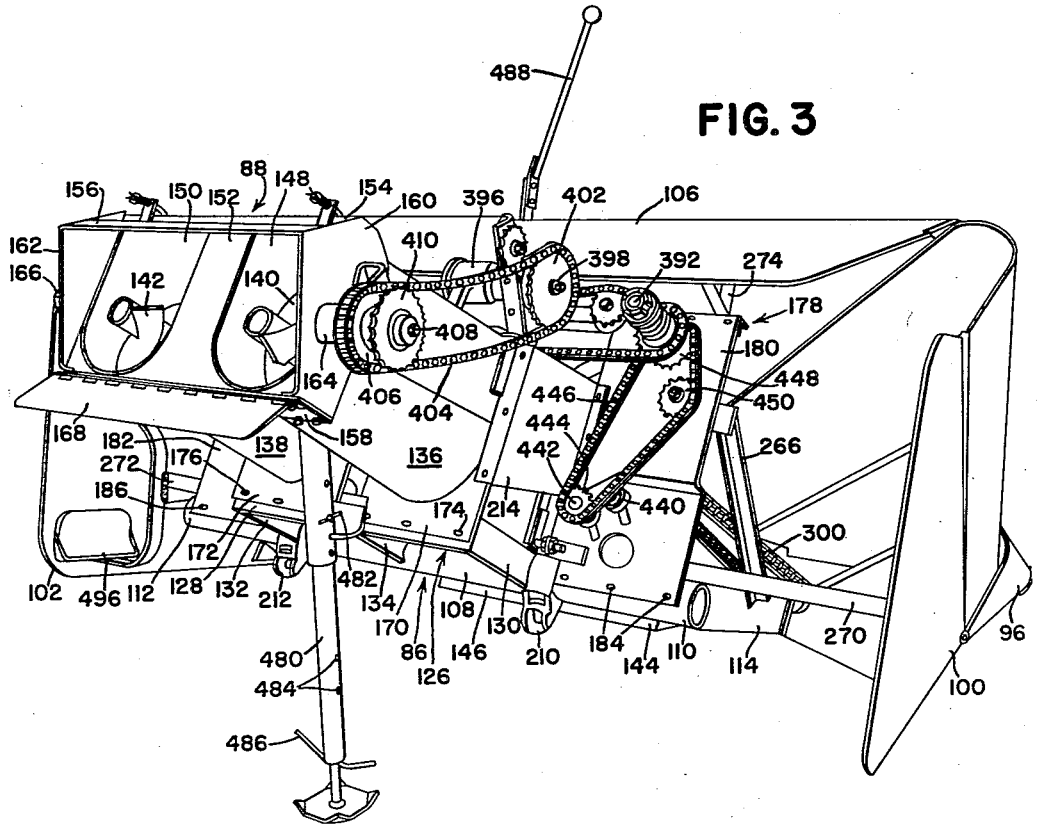
Fig. 3 is a rear perspective view on an enlarged scale, of the corn-harvester attachment, shown dismounted from the combine.

The conveyor housing structure 88 affords a central conveyor system and is here made up of a pair of parallel auger housings or troughs 136 and 138. Each of these is of elongated rigid construction so as to constitute a structural member as well as serving to rotatably support a conveyor in the form of an auger, there being a right-hand auger 140 and a left-hand auger 142. The disposition of the auger housings 136 and 138 is such that they incline upwardly and rearwardly from front ends 144 and 146 to a dual discharge opening afforded by open rear ends 148 and 150, respectively, intermediate portions of the auger housings being supported on the transverse support means afforded by the beam 108 and being additionally supported on the smaller U-shaped frame 126, the details of which will presently appear. Thus, as best shown in Fig. 3, the rear portions of the auger housings project considerably rearwardly of the beam 108 and the open rear or upper ends 148 and 150 thereof are at a level higher than that of the beam 108. The forward ends 144 and 146 of the auger housings are transversely alined and are in substantial transverse alinement with the front ends 122 and 124 of the side frame arms 114 and 116. In normal operation, the front ends 144 and 146 of the auger housings are proximate to the ground and the open rear or discharge ends 148 and 150 are in register with the crop inlet opening 66 of the combine body 20. A filler plate 152 closes the space between the closely transversely spaced apart rear ends of the auger housings and the rear end of the conveyor housing structure as a whole comprises a rearward structural extension portion that carries and is reenforced by a box-like structure 154 having top and bottom walls 156 and 158 and right- and left-hand side walls 160 and 162. The right-hand side wall is provided with a mounting member or trunnion 164 and a similar trunnion 166 (Figs. 3 and 4) is carried by the opposite wall 162. These trunnions are coaxial on a transverse horizontal axis and afford mounting means adapted to be received by the pivot brackets 76 and 78 of the combine body. A representative mounting, based on the receipt of the left-hand trunnion 166 by the left-hand pivot bracket 76, appears in Fig. 11, it being understood that the mounting of the right-hand trunnion in the right-hand pivot bracket 78 is similar. In order that delivery of crops by the augers 140 and 142 directly to the threshing mechanism, represented here by the cylinder 50 and concave 54, may be simple and without loss of crops, the bottom 158 of the box-like structure 154 carries a hinged flap 168 (Figs. 1 and 3).

Figure 8:
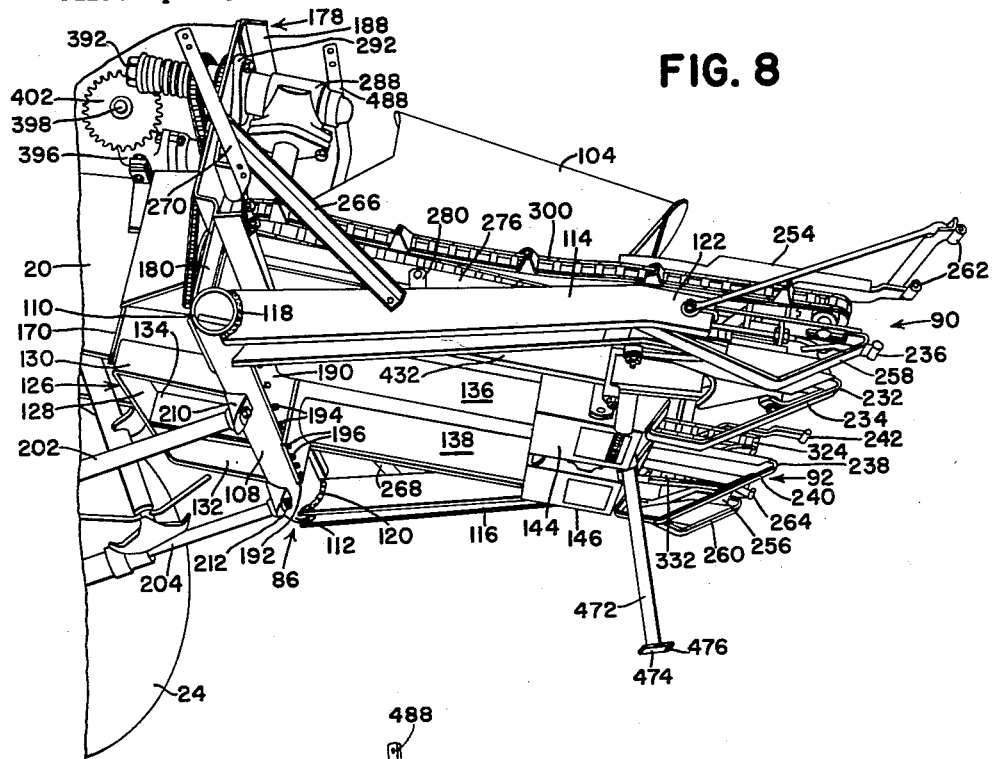
Fig. 8 is a fragmentary perspective view, on approximately the scale of Figs. 3 and 5, showing the mounting of the attachment on the combine, the shielding and styling structure being omitted from the view.

Part of the support for the intermediate portions of the auger housings 136 and 138 is accomplished by plate structure including a pair of U-shaped plates 170 and 172, bolted at 174 and 176 respectively to the transverse member 128 of the supporting frame 126 and extending upwardly and respectively secured to and embracing the auger housings (Fig. 3). An additional part of the support for the auger housings comprises a transverse rear bulkhead structure, designated generally by the numeral 178. This structure comprises right- and left-hand upright supports in the form of plates 180 and 182 that rise respectively from opposite ends 110 and 112 of the transverse main frame beam 108, the lower ends of these plates being rigidly secured to the beam as by cap screws 184 and 186. The upper ends of the plates are cross-connected by a tie or cross member 188, here in the form of a member of angled cross section to add strength. As best shown in Fig. 8, the auger housings 136 and 138 are further supported on the transverse beam 108 by rigid attachment to right- and left-hand plates 190 and 192 that are fixed to the beam 108 as by cap screws 194 and 196, respectively.

Since the auger housings themselves are of rigid unitary construction, and since they are rigidly secured to the U-shaped main frame 86, the rearward portions thereof provide a basic support or attachment for mounting on the combine body by means of the pivot brackets 76 and 78 and trunnions 164 and 166, thus carrying the attachment for vertical adjustment of the row crop devices 90 and 92 relative to the combine body. Power-operated means is utilized between the combine and the attachment for accomplishing vertical adjustment of the row crop devices 90 and 92 and for fixing the position thereof once adjusted. As representative of this means, the front axle 22 of the combine (Fig. 5) has a pair of transversely alined brackets 198 and 200 which respectively carry the rear ends of hydraulic cylinder and piston assemblies 202 and 204. These assemblies respectively have forwardly extending piston rods 206 and 208 which seat respectively in socketed members 210 and 212 rigidly carried in transverse spaced relation by the underside of the transverse beam 108. By any suitable control mechanism, such as a valve (not shown), the assemblies 202 and 204 may be extended or retracted to accomplish vertical adjustment of the attachment about the transverse pivot axis established by the trunnions and pivot brackets at 76—78 and 164—166.

As further means for rigidifying the auger housings and the support therefor with the transverse rear bulkhead structure 178, the framework includes right- and left-hand braces 214 and 216 that extend respectively from the upright supports or plates 180 and 182 to the rear auger-supporting U-shaped plates 170 and 172.

The front end portions of the auger housings 136 and 138 are cross-connected by transverse front bulkhead structure, designated generally by the numeral 218. This bulkhead comprises right- and left-hand upright plates 220 and 222 which respectively close the front ends of the auger housings 136 and 138, and these plates are cross-connected by a transverse tie member in the form of an angle 224. As previously described, the auger housings are closely spaced apart and respectively have upper inner marginal edge portions 226 and 228 running lengthwise of the housings. These edges are closely proximate and are tied together by a fore-and-aft structural member in the form of a relatively narrow, elongated tie plate 230, the front and rear ends of which may be tied to the front and rear bulkheads 218 and 178 to increase the strength and rigidity of the auger housings as the median backbone of the attachment structure.

The right-hand auger housing 136 has a forward extension 232 which provides a lower shoe 234 and an upper pivot bracket 236, the shoe 234 running on the ground during normal operation and the bracket 236 serving as part of means for supporting the central divider 94. A similar extension 238 is mounted on and projects forwardly from the left-hand auger housing 138 and this extension likewise has a ground-engaging shoe 240 and a central divider supporting bracket 242. The extensions 232 and 238 are tied together by a transverse brace in the form of an inverted U-shaped member 244 which in turn is braced from the transverse tie member 224 by fore-and-aft extending members 246 and 248. Additional, diagonally arranged right- and left-hand braces 250 and 252 are also used to increase the strength of the structure. The members 224, 244, 250 and 252 comprise supporting means for drive mechanism to be described below.

Figure 9:
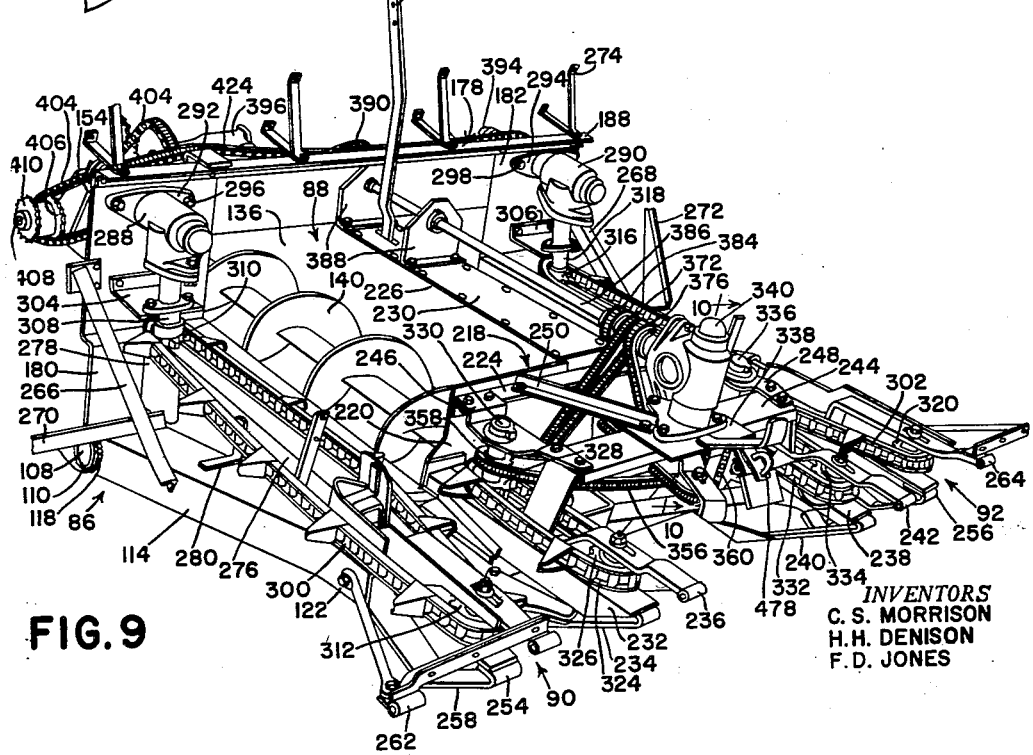
Fig. 9 is a front perspective view of the attachment on approximately the scale of Figs. 3, 5 and 8, and again the shielding and styling structure is omitted.

The right- and left-hand frame arms 114 and 116 respectively have forward extensions 254 and 256 thereon that afford ground-engaging shoes 258 and 260 and pivot brackets 262 and 264 for respectively mounting the right- and left-hand dividers 96 and 98. Additionally, the frame arms 114 and 116 are interconnected with the upright plates 180 and 182 by diagonal braces 266 and 268. Right- and left-hand supports for the right- and left-hand side sheets 100 and 102 are shown at 270 and 272, and a plurality of brackets or supports 274 are arranged on the transverse angle member 188 of the rear bulkhead 178 for supporting the transverse hood or shield 106. A diagonal frame member 276 has its front end proximate to the front end 122 of the side frame arm 114 and inclines upwardly therefrom to have its rear end supported at 278 on the right-hand up-right plate 180 of the rear bulkhead 178. An intermediate portion of the member 276 is supported by a bracket 280 on an intermediate portion of the arm 114. A left-hand member 282 is similarly arranged relative to the left-hand arm 116, having its forward end supported on the arm 116 at 284, an intermediate portion supported on the arm at 286, and its rear end supported on the left-hand upright plate 182 by means similar to the means 278. The structure will be clear from an analysis of Figs. 4 and 9.

The upright bulkhead plates 180 and 182 respectively carry first and second or right- and left-hand drive mechanism casings 288 and 290, these casings being respectively flanged at 292 and 294 for removable mounting on the front faces of the plate, as by cap screws 296 and 298, a constructional detail that facilitates assembly, disassembly and maintenance of the machine. Each casing contains appropriate drive mechanism (not shown) for receiving power initially from the power source on the combine and for transmitting the power to an associated gathering chain. Since the present attachment is of the two-row type, there are right- and left-hand outer gatherer means in the form of chains 300 and 302, these chains running respectively above and along the members 276 and 282, which thus serve as gatherer chain guides.

In addition to the flanges 292 and 294, the drive mechanism casings 288 and 290 are supported on the upright plates 180 and 182 respectively by brackets 304 and 306. The right-hand casing 288 has a depending shaft portion 308 to the lower end of which is keyed a gatherer-drive member or sprocket 310 about which the rear loop of the chain 300 is trained. The forward loop of the chain 300 is carried on an idler sprocket 312 that is appropriately journaled on the forward extension 254 of the arm 114. Since the right-hand arm 114 and the right-hand auger housing 136 are closely spaced apart transversely, there is defined between the two a fore-and-aft passageway 314, and the inner run of the gatherer chain 300 runs along this passageway to engage stalks and move them rearwardly, as is conventional in corn pickers and snappers in general.

The rear loop of the left-hand outer gatherer chain 302 is carried on a gatherer-drive member or sprocket 316 that is keyed to the lower end of a shaft 318 depending from the left-hand drive casing 290; and the front loop of the chain 302 is carried on an idler sprocket 320 appropriately journaled on the forward extension 256 of the right-hand frame arm 116. The spacing between the left-hand auger housing 138 and the left-hand arm 116 affords a longitudinal or fore-and-aft passageway 322, along which the inner run of the gatherer chain 302 moves.

A right-hand inner gatherer means or chain 324, considerably shorter than the chain 300 with which it cooperates, is carried by the right-hand auger housing extension 232 by means of a front idler sprocket 326 and a rear driven sprocket 328, the latter being keyed to an upright shaft 330 that is journaled at its upper end in the right-hand brace member 246. A left-hand inner gatherer means or chain 332 is mounted on the left-hand auger extension 238 in a manner similar to the mounting of the chain 324 on the right-hand extension 232. Visible at 334 is the front idler sprocket for the chain 332 and, although a rear sprocket corresponding to the sprocket 328 is not visible in the drawings, the location thereof will be clear from the illustration of an upright shaft 336 that corresponds to the shaft 330. The shaft 336 is carried in the left-hand brace member 248.

Figure 10:
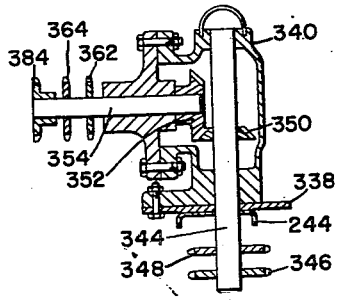
Fig. 10 is a sectional view, on an enlarged scale, as seen along the line 10—10 of Fig. 9.

Mounted on the transverse inverted U-shaped frame member 244 by means of a plate 338 is a third or centrally mounted drive mechanism casing 340, the plate 338 and the member 244 being apertured at 342 to receive a vertical drive shaft 344 that is journaled within the casing 340. As best shown in Fig. 10, the shaft 344 has a pair of sprockets 346 and 348 keyed to its lower end. An intermediate portion of the shaft 344 has fixed thereto a bevel pinion 350 that is in constant mesh with a bevel pinion 352 fixed to the interior forward end of a longitudinal input shaft or drive member 354, which is also journaled in the casing 340. The lower sprocket 346 is connected by a drive chain 356 to a driving sprocket 358 keyed to the upright shaft 330 for the right-hand inner gatherer chain 324. A second drive chain 360 is trained about the upper sprocket 348 and about idler sprockets and further about a sprocket (not shown) keyed the drive shaft 336 for the left-hand inner gatherer chain 332. The presence of the sprocket on the shaft 336 may be readily assumed from a comparison with the shaft 330 and sprockets 358 for the right-hand inner gatherer chain, but it must be understood that the idler arrangement for the drive chain 360 is such that the direction of rotation of the shaft 336 is opposite to that of the shaft 330, because the outer runs of the gatherer chains 324 and 332 must move rearwardly.

The input shaft 354 that enters the central casing 340 has keyed thereto front and rear sprockets 362 and 364. The sprocket 364 is transversely alined with a sprocket 366 that is keyed to a front auger shaft extension 368 which affords a coaxial input shaft for the right-hand auger 140, this shaft being carried in a suitable bearing 370 appropriately carried in the front wall or plate 220 of the front bulkhead 218. A drive chain 372 is trained about the sprocket 364 and about an idler sprocket 374 located just to the right of the auger shaft sprocket 366, the lower run of the chain 372 engaging the sprocket 366 to give the right-hand auger 140 the necessary direction of rotation. A chain 376 is trained directly about the sprocket 362 and a sprocket 378 keyed to a left-hand auger input shaft in the form of a coaxial extension 380, producing in the left-hand auger a direction of rotation opposite to that of the right-hand auger 140. A suitable bearing 382 carries the auger shaft 380 in the front wall or plate 222 of the front bulkhead 218.

The rear end of the central casing input shaft 354 is coupled at 384 to the forward end portion of a fore-and-aft extending drive shaft 386 by means of a chain and sprocket coupler of the type shown in the U. S. patent to Andrews 2,540,315, and this shaft projects rearwardly through the rear bulkhead 178, being supported intermediate its ends on fore-and-aft spaced bearing brackets 388, mounted on the longitudinal tie plate 230, and having keyed to its rear end an input sprocket 390. The rear bracket 388 connects the tie plate 230 to the intermediate portion of tie member 188. The drive mechanism casings 288 and 290 respectively have rearwardly projecting input shafts 392 and 394, which shafts, like the central drive shaft 386, project rearwardly through the rear bulkhead 178. The shafts 392 and 308 of the right-hand drive mechanism 288 may be interconnected by bevel gearing (not shown) like that shown in Fig. 10 for the central casing 340. The same may be true of the left-hand drive mechanism casing 290 as respects the left-hand shafts 394 and 318.

To the extent described, the mechanism has its power input from the rear and for this purpose the rear bulkhead carries power-transmitting means at the rear face thereof and including a main drive case 396 which has a transverse input shaft 398 and a forwardly extending output shaft 400, the two shafts being appropriately interconnected by bevel gearing (not shown). The input shaft 398 has keyed thereto a driving sprocket 402 which derives power via a drive chain 404 from a sprocket 406 that is keyed to a short cross shaft 408 coaxial with the right-hand trunnion 164, which is hollow and includes a bearing (not shown) for journaling the shaft 408. The shaft 408 has keyed thereto a second sprocket 410, which is driven by a chain 412 from a second sprocket 414 fixed to the outer end of the threshing cylinder shaft 52 alongside the sprocket 60. When the corn-harvester attachment is used with the combine in place of the combine header, the attachment is mounted as previously described and the drive chain 412 is connected between the sprockets 410 and 414. In a combine of the type illustrated, a sprocket such as the sprocket 414 is normally present to drive the header reel.

The forwardly projecting main output shaft 400 of the main drive case 396 has keyed thereto front, rear, and intermediate output members in the form of sprockets 416, 418, and 420. The front sprocket 416 is connected by a drive chain 422 to the sprocket 390 at the rear end of the central input shaft 386. Thus, the augers 140 and 142 are front-end-driven via the shafts 386 and 354 and in addition the shaft 354 drives the inner gatherer chain drive sprockets 346 and 348 through the intermediary of the gearing in the front central drive casing 340.

The rear sprocket 418 and the output shaft 400 are connected by a chain 424 to a sprocket 426 keyed to the rear end of the forwardly extending input shaft 394 for the left-hand drive mechanism casing 290. The intermediate sprocket 420 is connected by a drive chain 428 to a sprocket 430 keyed to the rear end of the forwardly projecting input shaft 392 for the right-hand drive mechanism casing 288. Thus, the outer gatherer chains 300 and 302 are power-driven from the main case 396.

The row-crop devices 90 and 92 have, in addition to the inner and outer gatherer chains 324, 332, 300, and 302, right- and left-hand pairs of snapping rolls, the right-hand pair comprising inner and outer rolls 432 and 434 and the left-hand pair comprising inner and outer rolls 436 and 438. The rear ends of the right-hand rolls 432 and 434 are journaled in any suitable manner in the right-hand upright plate 180 of the rear bulkhead structure 178, shaft extension portions of these rolls being visible at 440 and 442 in Fig. 3. That figure also shows that the shaft extension 442 for the inner roll 432 has keyed thereto a sprocket 444, and this sprocket is driven by a chain 446 trained about a drive sprocket 448 keyed to the right-hand casing input shaft 392. The chain 446 passes additionally around an idler 450. Fig. 6 shows that the rear end portions of the rolls are geared together at 452 so that the rolls 432 and 434 rotate in opposite directions toward each other, as is conventional.

A substantially similar arrangement is set up for the left-hand rolls 436 and 438, these rolls being intergeared at 454 and the outer roll in this case having a shaft extension 456 on which is keyed a sprocket 458 for receiving driving power via a chain 460 from a sprocket 462 keyed to the input shaft 394 of the left-hand drive casing 290. Because of the direction of power transmission, the outer roll 438 of the left-hand pair is driven, as distinguished from driving of the inner roll of the right-hand pair of rolls.

Figure 4:
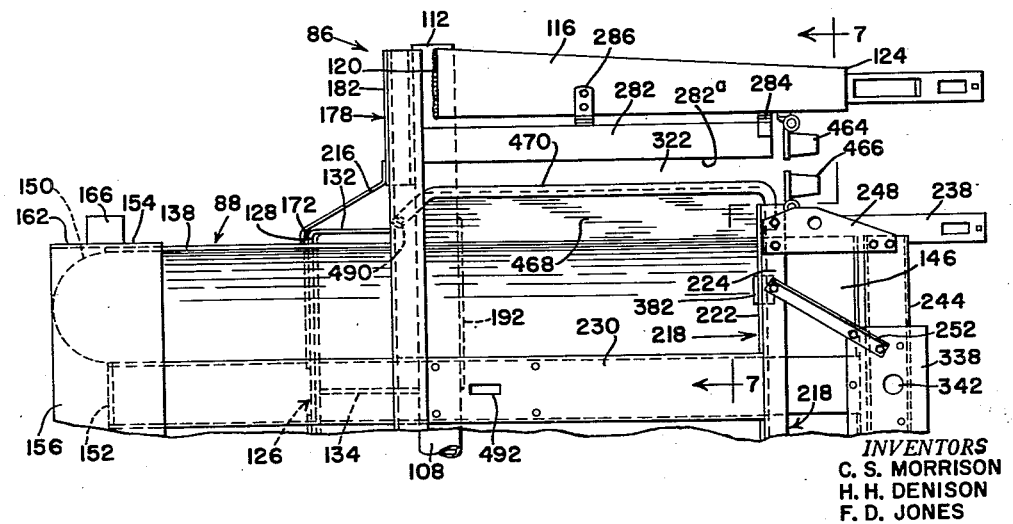
Fig. 4 is a plan view of the frame structure and auger housing at one side of the longitudinal median plane of the attachment.

As previously outlined, it is a feature of the invention that the auger housings themselves serve as structural members and require no additional framework. Consequently, the auger housings may be used respectively to support the forward ends of the inner snapping rolls, the forward ends of the outer snapping rolls being supported on the respective arms 114 and 116. Figs. 4 and 7 show the arrangement at the left-hand side of the attachment, wherein it will be seen that the left-hand arm 116 is equipped at its forward end with a bearing support 464 for the forward end of the left-hand outer snapping roll 438. Across the passageway 322 from the bearing support 464 is a similar bearing support 466 which is mounted on the box-like front portion 146 of the left-hand auger housing 138. This bearing support journals the forward end of the left-hand inner snapping roll 436. Similar construction is present for supporting the forward ends of the right-hand snapping rolls 432 and 434 and although this construction is not shown in detail its presence may be inferred from the arrangement at the left-hand side of the attachment structure.

Figure 2:
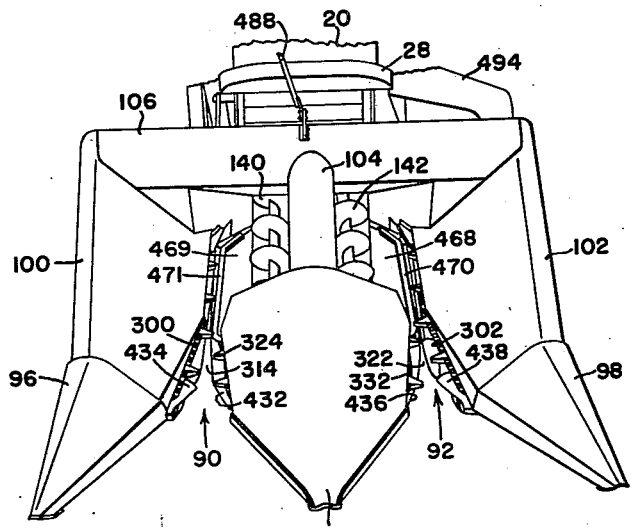
Fig. 2 is a perspective front view, on a slightly enlarged scale, of the machine shown in Fig. 1, a portion of the superstructure being omitted.

Also, as best shown in Figs. 4 and 7, the auger housing 138 is shaped so as to have an outwardly inclining ledge or lip 468 which lies along and above the center line of the left-hand inner snapping roll 436. A snapping bar 470 is carried at its front and rear ends by the auger housing and runs along the marginal edge of the lip or ledge 468 and thus cooperates with a proximate edge 282a along the bar 282 and with the snapping rolls in the severing of ears from standing stalks. As noted in Fig. 7, the center lines of the snapping roll bearings 464 and 466 are offset as is conventional. It will be further seen in this figure that the guide or diagonal member 282 at the left-hand side of the attachment frame overlies the snapping roll 438 and, as previously stated, the outer left-hand gatherer chain 302 runs just above the member 282. A symmetrical arrangement exists at the right-hand side of the attachment frame but, since the details are not visible, they are not described, but the general presence thereof will be clear from the appearance of the right-hand auger ledge 469 and the right-hand snapping bar 471 in Fig. 2.

Pivotally attached at its upper end in any suitable manner to the forward portion of the attachment as constituted by the closely spaced apart front portions 144 and 146 of the auger housings 136 and 138 is a swingable support leg 472 which has a foot 474 apertured at 476 to cooperate with a latch 478 (Fig. 9) when the support is in inoperative position. When the corn harvester attachment is pivotally mounted on the combine and is elevated by the hydraulic cylinder and piston assemblies 202 and 204 as shown in Fig. 8, the latch 478 may be released so that the leg 472 may drop to a depending position, the foot 474 engaging the ground to hold the attachment in its elevated position as a safety feature when maintenance or repair work is being performed on the underside of the attachment.

A second support 480 is carried at a rear portion of the attachment, this support being vertically telescopic, as will be readily seen, so that it can be extended or retracted, depending upon whether the machine is operating or the attachment is removed and is supported on the ground. In the latter case, the forward end of the attachment will rest on the shoes 234, 240, 258, and 260, and the telescopic support 480 will be extended as in Fig. 3 so that the bottom thereof engages the ground. This arrangement supports the attachment in position so that the combine, after its header has been removed, may be driven into place, with the pivot brackets 78 and 76 receiving the trunnions 164 and 166, after which the pins 84 are inserted, the cylinder and piston assemblies 202 and 204 are connected to the socketed brackets 210 and 212 and the machine is ready for operation, after the necessary driving connections have been made. The support 480 is retained in telescoped or retracted position by means of a locking pin 482 selectively cooperative with any one of several apertures 484. A handle 486 facilitates use of the support.

Visible at 488 in Figs. 1, 2, 3, 8, and 9 is an operating lever having connections, not material here, to the front ends of the right- and left-hand snapping bars 470 for the purpose of accomplishing lateral adjustment thereof, which result flows from the fact that the rear ends of the snapping bars are pivoted on vertical axes, the pivot for the left-hand snapping bar 470 appearing at 490 in Fig. 4. The longitudinal tie plate 230 is slotted at 492 to permit the lower end of the lever 488 to extend downwardly between the proximate inner walls or edges 226 and 228 of the auger housings 136 and 138, which details are not important but are described only generally because of the illustration thereof in the drawings.

A step and rail arrangement 494 is conventionally provided as part of the combine operator's station 28 and to augment this construction and to accomplish a ladder effect, the left-hand side sheet 102 has a pair of vertically spaced apart openings 496 which afford additional steps for aiding the operator in mounting on and dismounting from the operator's station of the machine.

The compactly arranged driving mechanism at the central forward end of the attachment provides a simple expedient for driving the inner gatherer chains 324 and 332 as well as establishing front-end drives for the augers 140 and 142, leaving the rear ends of the augers free and uninterrupted for efficient discharge of crops into the separator body 20 of the combine. That portion of the drive mechanism at the rear of the attachment follows pretty much the inverted U-shaped outline of the rear bulkhead 178 and thus is in a position of non-interference with the rear ends of the augers 140 and 142.

Various features of the invention not categorically enumerated herein will undoubtedly occur to those skilled in the art, as will many modifications and alterations in the preferred embodiment of the invention illustrated, all of which may be achieved without departing from the spirit and scope of the invention.

What is claimed is:

1. A corn-harvester attachment for a combine of the type having a mobile body including an upright transverse front end provided with a front crop-inlet opening bordered at opposite sides respectively by transversely spaced apart body portions that respectively have pivot brackets thereon alined on a transverse horizontal axis, and a rotary thresher element in the body immediately behind the opening and having a power shaft projecting transversely at one side of the body, said attachment comprising: an elongated transverse horizontal beam positionable in forwardly spaced relation to the inlet opening and having opposite ends; a pair of longitudinal arms rigidly secured respectively to the opposite ends of the beam and extending forwardly therefrom to transversely alined and widely spaced apart front ends; a pair of longitudinal conveyor housings rigidly supported on the beam and respectively having open rear ends projecting to the rear and front ends projecting ahead of the beam, said housings lying in close side-by-side relationship intermediate the arms and spaced laterally inwardly of its proximate arm so as to define a fore-and-aft passageway; a pair of trunnions, one on and projecting laterally outwardly from the rear end of each housing and alined on a transverse horizontal axis to be received by the body pivot brackets so that the open rear ends of the housings deliver directly to the rotary thresher element via the body front inlet opening; a pair of fore-and-aft snapping rolls positioned in side-by-side relationship in each passageway, one roll of each pair being supported by the associated arm and the other roll of each pair being supported by the associated housing, said rolls in each pair being rotatable to snap ears from standing stalks for transfer of such ears to the associated housing, said rolls having rear ends proximate to the transverse beam; a pair of transversely spaced supports rigid on and rising from opposite ends of the beam and respectively having means thereon journaling the rear ends of the rolls; a pair of conveyors, one in each housing, for conveying snapped ears to the open rear ends of the housings; and drive mechanism interconnecting the conveyors and snapping rolls and including an input shaft coaxial with one of the aforesaid trunnions and means on said shaft connectible to the power shaft of the thresher element.

2. The invention defined in claim 1, including: a pair of transversely spaced apart U-shaped plates coplanar in a transverse upright plane and positioned behind the beam and respectively receiving the housings ahead of their rear ends; means rigidly supporting the plates on the beam; and means rigidly connecting the plates on the aforesaid supports that rise from opposite ends of the beams.

3. The invention defined in claim 1, including: a rigid tie member extending transversely over the housings and having opposite ends rigidly connected respectively to the aforesaid supports that rise from opposite ends of the beams.

4. The invention defined in claim 1, in which: each housing has an upper inner marginal edge extending fore-and-aft and said edges are closely spaced apart; a fore-and-aft structural member runs along and rigidly interconnects said edges; a rigid tie member extends across and above said member and the housings and has an intermediate portion rigidly connected to the fore-and-aft structural member and opposite end portions rigidly joined to the aforesaid supports that rise from the opposite ends of the beam.

5. The invention defined in claim 1, in which: each conveyor is an auger and said auger has a forwardly disposed coaxial input shaft; the housings respectively have upper inner portions closely adjacent to each other and rigidly interconnected; and the drive mechanism includes a longitudinal shaft journaled on and supported above said housing portions, said longitudinal shaft having a forward end portion drivingly connected to the auger input shafts.

6. The invention defined in claim 1, in which: each support that rises from the beam is in the form of an upright transverse plate; a drive casing is carried by and in front of each plate and includes a gatherer-drive member; each arm carries gatherer means ahead of the proximate casing; each gatherer means is connected to the proximate drive member; each housing has a forward extension and additional gatherer means is carried on each extension; and the drive mechanism includes a longitudinal shaft above the housings and centrally therebetween, said shaft having a forward end drivingly connected to the additional gatherer means.

7. A corn-harvester attachment for mounting on a mobile frame having a power source, a front inlet opening and supporting structure proximate to the opening, said attachment comprising: a U-shaped attachment frame including a transverse horizontal beam and a pair of transversely widely spaced arms rigid with the beam and extending forwardly therefrom to free front ends; conveyor housing means having front and rear ends and an intermediate portion and being of longitudinally, transversely and vertically rigid construction so as to constitute a fore-and-aft structural element, said housing means being rigidly secured at its intermediate portion to a portion of the beam centrally between the arms so that the rear end of said housing means projects rearwardly of the beam as a rigid rear support, said housing means extending forwardly from the beam as a rigid front support in centrally spaced relation to the arms so as to provide at each side thereof and between the associated arm a fore-and-aft passageway, the front end of said housing means lying substantially in transverse alinement with the front ends of the arms; said housing means having a discharge opening at its rear end and further having at its said rear end mounting means cooperative with the mobile frame supporting structure to mount said attachment on the mobile frame with the discharge opening of the housing means in register with the mobile frame inlet opening; first and second crop-gathering means positioned respectively along the passageways and carried in part respectively by opposite sides of the housing means and in part by the proximate arms for gathering crops and delivering them to the housing means; conveyor means in the housing means for moving gathered crops rearwardly to the discharge opening; and drive mechanism carried by said attachment and having driving connections to the gathering and conveying means, said drive mechanism having a rearwardly positioned input member connectible to the power source on the mobile frame.

8. A corn-harvester attachment for mounting on a mobile frame, comprising: a U-shaped attachment frame including a transverse horizontal beam and a pair of transversely widely spaced arms rigid with the beam and extending forwardly therefrom to free front ends; a pair of fore-and-aft conveyor housings lying closely side by side and centrally spaced between the arms to leave a fore-and-aft passageway between each housing and its proximate arm, each housing having an intermediate portion rigidly secured to the beam, a rear portion projecting rigidly rearwardly from the beam as a rear support and a front portion projecting rigidly forwardly as a front support having a front end substantially in transverse alinement with the front ends of the arms, each housing having a longitudinal inner upper portion and said portions lying parallel and proximate to each other; rear transverse bulkhead structure rigidly joining the housings and the beam; front transverse bulkhead structure rigidly joining the front ends of the housings; and a fore-and-aft extending structural member extending between the bulkheads and joining the proximate inner portions of the housings.

9. The invention defined in claim 8, in which: the rear bulkhead structure includes a pair of upright supports secured to and rising from the beam respectively in fore-and-aft alinement with the arms and a transverse tie member cross-connecting said supports and lying above the conveyor housings to enable crops in said housings to pass thereunder; first and second drive mechanism casings, one mounted on each support and each including a drive member; supporting means connected to the front bulkhead structure; a third drive mechanism casing on said supporting means and including a drive member; and crop-gathering and conveying mechanism carried by the arms and housings and drivingly connected to the drive members in the casings.

10. A corn-harvester attachment for mounting on a mobile frame, comprising: a U-shaped attachment frame including a transverse horizontal beam and a pair of transversely widely spaced arms rigid with the beam and extending forwardly therefrom to free front ends; a pair of fore-and-aft conveyor housings lying closely side by side and centrally spaced between the arms to leave a fore-and-aft passageway between each housing and its proximate arm, each housing having an intermediate portion rigidly secured to the beam, a rear portion projecting rigidly rearwardly from the beam as a rear support and a front portion projecting rigidly forwardly as a front support having a front end substantially in transverse alinement with the front ends of the arms; rear transverse bulkhead structure rigidly joining the housings and the beam; and front transverse bulkhead structure rigidly joining the front ends of the housings.

11. A corn-harvester attachment for a mobile frame having a front crop inlet opening, comprising: a transverse main beam having opposite ends and first and second transversely widely spaced apart arms rigidly connected to the beam respectively at said opposite ends and extending forwardly therefrom to free front ends; first and second fore-and-aft housings lying closely side-by-side and centrally spaced between the arms so as to leave first and second fore-and-aft passageways respectively between the housings and the proximate arms, said housings being rigidly secured to the beam and projecting freely forwardly therefrom to front ends substantially in transverse alinement with the front ends of the arms, said housings respectively having open rear ends to discharge into the crop-inlet opening of the mobile frame; transverse rear bulkhead structure rigidly connected to and generally paralleling the beam and cross-connecting the housings, said structure carrying first and second drive mechanisms respectively substantially in fore-and-aft alinement with the passageways; front bulkhead structure rigidly cross-connecting the front ends of the housings and carrying a third drive mechanism centrally between the arms; first and second outer gatherer means carried respectively by the first and second arms and connected respectively to the first and second drive mechanisms; first and second support extensions respectively on the auger housings; first and second inner gatherer means carried respectively by said extensions and connected respectively to the third drive mechanism; and first and second conveyors carried respectively by the first and second housings and respectively having forwardly projecting shaft means connected respectively to said third drive mechanism.

12. The invention defined in claim 11, in which: each of the first and second drive mechanisms is mounted ahead of and includes an input shaft projecting rearwardly through the rear bulkhead structure; the third drive mechanism has an input shaft extending rearwardly; a central drive shaft projects forwardly through the rear bulkhead structure and is connected to the input shaft of the third drive mechanism; and the rear bulkhead structure carries rearwardly thereof a power-transmitting means having output members connected to the input shafts of the first and second drive mechanisms and to the central shaft.

13. A corn-harvester attachment for mounting on a mobile frame having a power source and a front crop-inlet opening, comprising: a pair of parallel auger housings extending fore-and-aft in close side-by-side relationship and having open rear ends and closed front ends; transverse support means rigidly interconnecting the housings adjacent to their rear ends and having opposite portions projecting laterally outwardly respectively beyond the housings; means on the rear ends of the auger housings for mounting the attachment on the mobile frame with the open rear ends of the housings in register with the crop-inlet opening; a pair of support arms rigidly secured respectively to the opposite portions of the transverse support means and extending forwardly respectively alongside and spaced outwardly of the housings to define with said housings a pair of fore-and-aft passageways; forward extension structure interconnecting the front ends of the housings; paired snapping rolls lying respectively along the passageways, one roll of each pair having a forward end journaled on the forward extension structure and the other roll of each pair having a forward end journaled on the proximate arm; and rear plate means on each of the opposite portions of the transverse support means and journaling the rear ends of the associated pair of rolls.

14. A corn-harvester attachment for a combine of the type having a body including an upright front end carried on a transverse wheeled support and provided with a front crop-inlet opening above the wheeled support and delineated at opposite sides by body structure including spaced pivot brackets alined on a transverse horizontal axis, said attachment comprising: an attachment frame positionable ahead of and at a level below the crop-inlet opening a pair of transversely spaced, fore-and-aft extending row-crop devices carried by the attachment frame for gathering crops from adjacent rows and for delivering such crops transversely inwardly toward the longitudinal median plane of the attachment; fore-and-aft conveying means carried by the attachment frame centrally between the devices and arranged to receive crops from said devices and to convey such crops rearwardly, said conveying means including a structural extension portion projecting upwardly and rearwardly of the attachment frame to the level of and in immediate proximity to the crop-inlet opening, said portion having a rear discharge opening for register with the crop-inlet opening; pivot means on the extension portion including laterally oppositely extending pivot members coaxial on a transverse horizontal axis for receipt by the pivot brackets of the combine to carry the attachment frame for vertical adjustment about said axis relative to the combine body; and means on the attachment frame ahead of and at a level below said axis for adjustable connection to the wheeled support of the combine.

15. The invention defined in claim 14, in which: the conveying means comprises a pair of individual, fore-and-aft extending auger housings and augers therein, one for each row-crop device, the structural extension comprises coterminous rear portions of the auger housings arranged to project into immediate proximity to the crop-inlet opening, the discharge opening constitutes the open rear ends of the auger housings, and the augers deliver rearwardly and directly to said open rear ends.

16. Frame structure for a crop harvester of the class described, comprising: an elongated transverse beam having first and second opposite ends; first and second arms having rear ends rigidly connected respectively to the first and second ends of the beam and extending forwardly therefrom respectively to first and second front ends; a U-shaped support element having legs rigidly joined to and extending rearwardly from a mid-portion of the beam and a bight cross-connecting said legs and spaced rearwardly of the beam; first and second conveyor troughs lying in side-by-side relation and extending fore and aft and centrally between and spaced equally respectively from the first and second arms to afford first and second fore-and-aft passageways, said troughs lying above the beam and the U-shaped support and having rearwardly opening rear ends behind the U-shaped support, intermediate portions sustained by the bight of said U-shaped support, and free front ends substantially in transverse alinement with the front ends of the arms; first and second upright supports secured respectively to the first and second ends of the beam respectively in substantially fore-and-aft alinement with the first and second passageways; and a tie member extending transversely over the troughs and having opposite ends connected respectively to the upright supports.

17. The invention defined in claim 16, in which: the intermediate portions of the troughs are sustained by the bight of the U-shaped support by means of plate structure secured to and rising from said bight and embracing the troughs from below; and first and second brace means are connected respectively to the upright supports and extend rearwardly to connections with the plate structure.

18. A corn harvester attachment for a combine of the type having a mobile body including an upright tranverse front end provided with a front crop-inlet opening, comprising: a pair of parallel auger housings extending fore-and-aft in close side-by-side relationship and having open rear ends and closed front ends; transverse support means rigidly interconnecting the housings adjacent to their rear ends and having opposite portions projecting laterally outwardly respectively beyond the housings; means on the rear ends of the auger housings for mounting the attachment on the mobile body with the open rear ends of the housings in register with the crop-inlet opening; a pair of support arms rigidly secured respectively to the opposite portions of the transverse support means and extending forwardly respectively alongside and spaced outwardly of the auger housings to define with said housings a pair of fore-and-aft passageways; forward extension structure interconnecting the front ends of the housings; paired snapping bars lying respectively along the passageways; one bar of each pair supported by the extension structure and the other bar of each pair supported by the proximate arm; paired fore-and-aft elongated rolls lying respectively along the passageway beneath the snapping bars, said rolls in each pair being rotatable to draw stalks downwardly for causing ears of corn attached thereto to be severed from the stalk upon contacting the snapping bars, one roll of each pair having a forward end journaled on the forward extension structure and the other roll of each pair having a forward end journaled on the proximate arm; and rear means on each of the opposite portions of the transverse support means and journaling the rear ends of the associated pair of rolls.

19. A corn harvester attachment for a combine of the type having a mobile body including an upright transverse front end provided with a front crop-inlet opening, comprising: a pair of parallel auger housings extending fore-and-aft in close side-by-side relationship and having open rear ends and closed front ends; transverse support means rigidly interconnecting the housings adjacent to their rear ends and having opposite portions projecting laterally outwardly respectively beyond the housings; means on the rear ends of the auger housings for mounting the attachment on the mobile body with the open rear ends of the housings in register with the crop-inlet opening; a pair of support arms rigidly secured respectively to the opposite portions of the transverse support means and extending forwardly respectively alongside and spaced outwardly of the auger housings to define with said housings a pair of fore-and-aft passageways; forward extension structure interconnecting the front ends of the housings; snapping bars positioned along the respective passageways; paired fore-and-aft elongated rolls lying respectively along the passageway beneath the snapping bars, said rolls in each pair being rotatable to draw stalks downwardly for causing ears of corn attached thereto to be severed from the stalk upon contacting the snapping bars, one roll of each pair having a forward end journaled on the forward extension structure and the other roll of each pair having a forward end journaled on the proximate arm; and rear means on each of the opposite portions of the transverse support means and journaling the rear ends of the associated pair of rolls.

20. A corn harvester attachment for a combine of the type having a mobile body including an upright transverse front end provided with a front crop-inlet opening, comprising: a pair of auger housings extending fore-and-aft in close side-by-side relationship and having open rear ends and closed front ends; transverse support means rigidly interconnecting the housings proximate their front and rear ends and including portions thereof spaced outwardly from the housings to define with the housings a pair of fore-and-aft extending passageways; means on the rear ends of the auger housings for mounting the attachment on the mobile frame with the open rear ends of the housings in register with the crop-inlet opening; fore-and-aft extending snapping bars carried by the support means in the passageways; a pair of fore-and-aft elongated rolls mounted on the support means and positioned in side by side relationship in each passageway and beneath the snapping bars, said rolls in each pair being rotatable to draw stalks downwardly for causing ears of corn attached thereto to be severed from the stalk upon contacting the snapping bars; and a pair of augers, one journaled in each auger housing, for conveying severed ears to the open rear ends of the auger housings.

21. A corn harvester attachment for use with a combine of the type having a body provided with a front crop-inlet opening and support means on the combine adjacent to the opening, comprising: a fore-and-aft conveyor housing element having a rear discharge end; mounting means on said attachment adjacent to said rear end and cooperable with the support means for connecting the attachment to the combine so that the conveyor housing element feeds at its rear discharge end to the opening and extends centrally and forwardly; means on the attachment including portions spaced laterally outwardly respectively from opposite sides of said element to define with said element a pair of fore-and-aft crop-receiving passageways; fore-and-aft snapping bars on said attachment, at least one bar lying along each passageway; fore-and-aft elongated roll means mounted on the attachment and positioned respectively proximate to the snapping bars, each roll means being operative to cause stalks to move downwardly so that stalk-borne ears of corn are detached by the respective snapping bars and move laterally inwardly to the central conveyor housing element; and rearwardly moving conveyor means in said element for conveying detached ears to the rear discharge end of said element.

22. A row-crop harvester attachment for use with a combine of the type having a body including an upright front end carried on a transverse wheeled support and delineated at opposite sides by body structure including spaced pivot brackets alined on a transverse horizontal axis, said attachment comprising an attachment frame element; a pair of transversely spaced fore-and-aft extending row-crop devices carried by said frame element for gathering crops from adjacent crop rows and for delivering such crops transversely inwardly toward the median plane of said attachment; a conveyor housing element carried by the frame element centrally between the devices and having opposite sides respectively proximate to and arranged to receive crops from said devices; said conveyor housing element having front and rear transverse structural members traversing said median plane; rear extension means on one of said elements and disposed rearwardly of and generally centrally as respects said devices and including laterally oppositely extending pivot members receivable by the aforementioned pivot brackets to carry the attachment for vertical adjustability about said axis; said conveyor housing element having a rear discharge opening substantially at the level of and between the pivot members and further having means for moving crops, received from said devices, rearwardly to said rear discharge opening; and means on said attachment operative to adjust the attachment about said axis.

23. For use with a self-propelled combine of the type having a relatively narrow fore-and-aft body carried between a pair of relatively widely transversely spaced apart forwardly located traction wheels adapted to straddle a pair of adjacent crop rows, said body including a forwardly-facing crop-inlet opening substantially centrally between the wheels and above the axle and support means adjacent to said opening and generally centrally between said wheels; a row-crop harvester attachment including a generally central portion having rear mounting means adapted to cooperate with the above-mentioned support means to carry said attachment with said central portion extending forwardly and centrally between the crop rows, said attachment further including a pair of opposite outer portions spaced laterally outwardly respectively from opposite sides of said central portion to extend respectively laterally outwardly beyond the straddled rows and ahead of the rear mounting means and forming with the respective proximate sides of said central portion a pair of fore-and-aft passageways for receiving crops from the straddled rows; frame means connected with said portions and including transverse beam structure spanning the three portions ahead of said rear mounting means and having a central part connected with the central portion and a pair of outer end parts connected respectively with the outer portions; a pair of outer gatherer means respectively on the outer portions and operative in the respective passageways to move crops rearwardly therein; fore-and-aft conveyor housing structure connected with the central portion for receiving crops from the gatherer means and having an elevated rear discharge end adjacent to the aforesaid mounting means; means on certain of said portions and respectively along said passageways for causing crops from the gatherer means to move oppositely laterally inwardly to the conveyor housing structure; and rearwardly and upwardly moving crop-conveying means in the conveyor housing structure for moving crops through said discharge end.

24. For use with a self-propelled combine of the type having a relatively narrow fore-and-aft body carried on a transverse axle and generally centered between a pair of relatively widely transversely spaced apart forwardly located traction wheels adapted to straddle a pair of adjacent crop rows, said body including a forwardly facing crop-inlet opening substantially centrally between the wheels: a row-crop harvester attachment adapted to straddle at least the same two crop rows and including a generally central portion having rear combine-engageable mounting means adapted to carry the attachment on the combine with said central portion alined fore-and-aft with and ahead of the inlet opening; said structure further having a pair of opposite outer portions extending laterally outwardly from said central portion respectively beyond opposite sides of the rear mounting means; a central conveyor system on and extending forwardly from said central portion substantially in fore-and-aft alinement with the rear mounting means to be flanked by the straddled rows; a pair of row-crop gatherer means respectively on the outer portions and extending forwardly therefrom respectively at opposite sides of the central conveyor system and affording a pair of fore-and-aft passageways opening forwardly for receiving crops respectively from the straddled rows and for causing such crops to move oppositely laterally inwardly toward the conveyor system; and said conveyor system having a rear crop-delivery end adjacent to the rear mounting means and rearwardly moving means for feeding crops through said crop-delivery end.

References Cited in the file of this patent

UNITED STATES PATENTS

| | | |
|---|---|---|
| 1,879,588 | Synck | Sept. 27, 1932 |
| 1,940,851 | Everett et al. | Dec. 26, 1933 |
| 1,968,998 | Elliott | Aug. 7, 1934 |
| 1,984,895 | Rosenthal et al. | Dec. 18, 1934 |
| 2,009,514 | Paradise | July 30, 1935 |
| 2,360,131 | Hitchcock | Oct. 10, 1944 |
| 2,549,999 | Andrews | Apr. 24, 1951 |